United States Patent
Moser

(10) Patent No.: US 11,914,534 B2
(45) Date of Patent: Feb. 27, 2024

(54) METHOD FOR DATA TRANSMISSION AND CIRCUIT ARRANGEMENT THEREOF

(71) Applicant: VEGA GRIESHABER KG, Wolfach (DE)

(72) Inventor: Patrick Moser, Seelbach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 17/358,963

(22) Filed: Jun. 25, 2021

(65) Prior Publication Data

US 2022/0043763 A1 Feb. 10, 2022

(30) Foreign Application Priority Data

Jul. 14, 2020 (EP) ..................................... 20185838

(51) Int. Cl.
*G06F 13/24* (2006.01)
(52) U.S. Cl.
CPC ..................................... *G06F 13/24* (2013.01)
(58) Field of Classification Search
CPC ...... G06F 13/00; G06F 13/24; G06F 13/4036; G06F 13/4022; G06F 13/4031
See application file for complete search history.

(56) References Cited

U.S. PATENT DOCUMENTS

| | | | |
|---|---|---|---|
| 7,805,629 B2 * | 9/2010 | Insley | H04L 1/1607 |
| | | | 714/13 |
| 9,441,401 B2 * | 9/2016 | Nardelli | G08C 17/02 |
| 2002/0073348 A1 * | 6/2002 | Tani | G06F 1/3203 |
| | | | 713/300 |
| 2004/0158650 A1 * | 8/2004 | Nakamura | G06F 13/24 |
| | | | 710/1 |
| 2005/0053095 A1 * | 3/2005 | Kato | G06K 7/0008 |
| | | | 348/E5.097 |
| 2015/0199287 A1 | 7/2015 | Sngoku | |
| 2020/0320028 A1 | 10/2020 | Hubbard et al. | |
| 2022/0043763 A1 * | 2/2022 | Moser | G06F 13/24 |

OTHER PUBLICATIONS

EPO extended search report for related European application 20185838 dated Nov. 12, 2020.
Ams datasheet AS3911B; Jun. 12, 2014, vol. 1-08; XP055344085, found on Internet: URL: http: //www.pmt-fl.com/downloads/wireless-connectivity/AS3911BDatasheet_EN_v4.pdf.

* cited by examiner

*Primary Examiner* — Henry Tsai
*Assistant Examiner* — Kim T Huynh
(74) *Attorney, Agent, or Firm* — William Gray Mitchell

(57) ABSTRACT

The present invention describes a method for data transmission between an integrated circuit and an evaluation unit connected to an interrupt pin of the integrated circuit, characterized in that the data transmission is carried out by selectively triggering an atypical interrupt signal or a plurality of interrupt signals composed of regular and/or atypical interrupt signals.

18 Claims, 3 Drawing Sheets

METHOD FOR DATA TRANSMISSION AND CIRCUIT ARRANGEMENT THEREOF

CROSS REFERENCE TO RELATED APPLICATIONS

This patent application claims priority to European Patent Application 20185838.8, filed on Jul. 14, 2020.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention comprises a method for data transmission and circuit arrangement thereof.

BACKGROUND OF THE INVENTION

The present invention relates to a method for data transmission between an integrated circuit and an evaluation unit according to the preamble of claim 1, the use of such a method for data transmission between an integrated circuit and an evaluation unit according to the preamble of claim 13 and a circuit arrangement according to claim 15.

A variety of methods for data transmission between integrated circuits and downstream circuits are generally known from the state of the art.

There are write commands for so-called NFC tags, for example, by means of which data received by the NFC circuit of the NFC tag is passed on to a downstream circuit, for example to write to a memory.

However, there are systems that may not support this write command. This can be the case either for a transmitter of the NFC connection or for the NFC circuit being used. This is considered to be disadvantageous.

Using the interrupt pin of an integrated circuit, which monitors an interface or another data source, for example, to selectively make events detectable is known from the state of the art as well. Depending on the integrated circuit, there can be various reasons for changing/triggering an interrupt signal. These interrupt signals generated by the integrated circuit can have different forms and durations. A permanent level change or the generation of a pulse, for example, can be used as an interrupt signal. A duration of the generated pulse or a repetition rate of the pulses can vary too.

However, these signals generated by integrated circuits always serve only to signal a desired event. These can be events such as "WakeUp", "Buffer full/empty", etc.

Data transmission using said signals is not possible.

The underlying object of the present invention is therefore to further develop a method for data transmission between an integrated circuit and an evaluation unit connected to an interrupt pin of the integrated circuit. A further task is to provide the use of a method according to any one of the preceding claims for data transmission between an integrated circuit and an evaluation unit connected to an interrupt pin of the integrated circuit and to specify a circuit arrangement comprising an integrated circuit, which is configured as an NFC circuit, and an evaluation unit, which is configured in two parts as a logic unit and a microcontroller.

These objects are achieved by a method having the features as disclosed herein, along with the disclosed use of said method and circuit arrangement.

BRIEF SUMMARY OF THE INVENTION

In a preferred embodiment, method for data transmission between an integrated circuit (3) and an evaluation unit (5) connected to an interrupt pin (31) of the integrated circuit (3), characterized in that the data transmission is carried out by selectively triggering an atypical interrupt signal (92) or a plurality of interrupt signals (90, 92) composed of regular and/or atypical interrupt signals (90, 92).

In another preferred embodiment, the method according as disclosed herein, characterized in that the atypical interrupt signal or signals (92) have a duration ($T_1$, $T_2$) that differs from that of a regular interrupt signal (90).

In another preferred embodiment, the method as disclosed herein, characterized in that the plurality of interrupt signals is configured as a sequence of regular interrupt signals (90) and/or atypical interrupt signals (92).

In another preferred embodiment, the method as disclosed herein, characterized in that the sequence is configured as a succession of interrupt signals (90, 92) having different distances (A T) between the interrupt signals (90, 92).

In another preferred embodiment, the method as disclosed herein, characterized in that the evaluation unit (5) is in a sleep mode, from which it is reactivated by means of the atypical interrupt signal (92) or the plurality of interrupt signals composed of regular interrupt signals (90) and/or atypical interrupt signals (92).

In another preferred embodiment, the method as disclosed herein, characterized in that the evaluation unit (5) is configured in two parts as a logic unit (7) and a microcontroller (9), wherein both the logic unit (7) and the microcontroller (9) are connected to the interrupt pin (31), and, when it receives an atypical interrupt signal (92), the logic unit (7) activates the microcontroller (9) and the microcontroller (9) evaluates further interrupt signals (90, 92), thus transmitting the data.

In another preferred embodiment, the method as disclosed herein, characterized in that the evaluation unit (5) returns to sleep mode after a specified time (t) or after a specified signal.

In another preferred embodiment, the method as disclosed herein, characterized in that the interrupt signal or signals (90, 92) are generated by reading data from the integrated circuit (3).

In another preferred embodiment, the method according as disclosed herein, characterized in that the data is read block by block.

In another preferred embodiment, the method as disclosed herein, characterized in that the data transmission writes to a memory (51).

In another preferred embodiment, the method as disclosed herein, characterized in that the evaluation unit (5) writes to a memory (51 or 52) of the integrated circuit (3), thus configuring a backward channel.

In another preferred embodiment, the method as disclosed herein, characterized in that the data originates from a data source (11) that is wirelessly connected to the integrated circuit (3).

In another preferred embodiment, use of a method as described herein for data transmission between an integrated circuit (3) and an evaluation unit (5) connected to an interrupt pin (31) of the integrated circuit (3).

In another preferred embodiment, use of a method as described herein, characterized in that the integrated circuit (3) is configured as an NFC circuit and the evaluation unit (5) is configured as an FPGA or microcontroller (9).

In another preferred embodiment, a circuit arrangement (1) comprising an integrated circuit (3), which is configured as an NFC circuit, and an evaluation unit (5), which is configured in two parts as a logic unit (7) and a microcontroller (9), wherein the logic unit (7) and the microcontroller (9) are directly or indirectly connected to an interrupt pin (31) of the integrated circuit (3) and an output of the logic unit (7) is connected to an input of the microcontroller (9).

In another preferred embodiment, the circuit arrangement (1) as disclosed herein, characterized in that both the logic unit (7) and the microcontroller (9) are directly connected to the interrupt pin (31).

In another preferred embodiment, the circuit arrangement (1) as disclosed herein, characterized in that the logic unit (7) comprises a buffer for storing a sequence of interrupt signals.

DETAILED DESCRIPTION OF THE INVENTION

Figure 1:
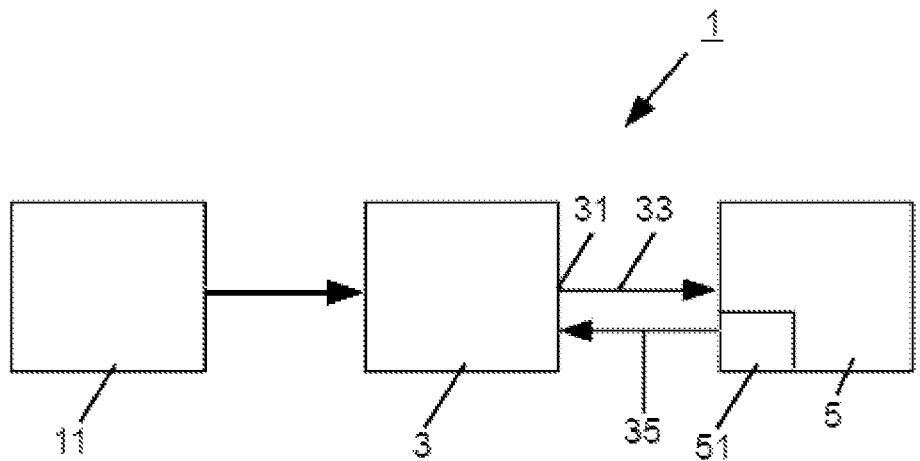
FIG. 1 is a schematic drawing evidencing a first design example of a circuit arrangement, in which the method according to the present application can be used.

A method is disclosed for data transmission between an integrated circuit and an evaluation unit connected to an interrupt pin of the integrated circuit is characterized in that the data transmission is carried out by selectively triggering an atypical interrupt signal or a plurality of interrupt signals composed of regular and/or atypical interrupt signals.

Since data transmission is carried out by selectively triggering an atypical interrupt signal or a plurality of interrupt signals composed of regular and/or atypical interrupt signals, data can be transmitted by the integrated circuit even if this is not actually provided for by the integrated circuit itself or is not supported by a third-party component communicating with the integrated circuit.

According to the present invention, data transmission should be understood to be the transmission of freely selectable data from the integrated circuit to the evaluation unit. The mere signaling of a predetermined state or event does not constitute data transmission in this sense.

In the present application, a distinction is made between regular interrupts and atypical interrupts. A regular interrupt is a signal that, depending on the respective integrated circuit, has a specified form and duration. An atypical interrupt signal differs in form and duration from a regular interrupt signal. A plurality of interrupt signals composed of regular and/or atypical interrupt signals is a series of regular interrupt signals or a series of regular and atypical interrupt signals.

By using the interrupt output of an integrated circuit, further information can selectively be transmitted to the evaluation unit, which can include other components such as microcontrollers or field-programmable gate arrays (FPGA). Selectively generating these interrupts, which are evaluated by the evaluation unit, makes it possible to selectively transmit data. These selectively generated interrupts can be identified at the interrupt pin as "patterns" or "sequences".

The present method can, for example, be used for communication between a data source and an evaluation unit configured as a microcontroller. The data source can be a mobile phone, for example, which can communicate with the integrated circuit, for example an NFC circuit, only via read accesses. A corresponding read access generates an interrupt signal of the integrated circuit and transmits it to the microcontroller. Now, if a plurality of interrupt signals are triggered in succession by a plurality of read accesses according to the present configuration, it is possible, with an appropriate configuration of the series, to transmit information from the mobile phone via the integrated circuit to the microcontroller in this way, even though the connection between the mobile phone and the integrated circuit and/or the connection between the integrated circuit and the microcontroller is not originally designed for this purpose.

The atypical interrupt signals have a duration that differs from that of a regular interrupt signal, which refers in particular to a total duration of the interrupt signal or the duration for which a changed level is present. The use of atypical interrupt signals makes it possible to clearly distinguish between regular interrupts and data transmission. This ensures that a series of regular interrupts are not confused with a data transmission.

The plurality of interrupt signals is preferably configured as a sequence of regular and/or atypical interrupt signals. A sequence is a series of consecutive signals. Different information can be transmitted by using different sequences. The sequences can differ in the number and duration of the interrupt signals and/or the duration of the distances between the interrupt signals. If atypical interrupt signals are used, both the duration of the interrupt signals and the duration of the distances between the interrupt signals can vary.

The sequence can alternatively be configured as a succession of interrupt signals having different distances between the interrupt signals. This means that, when a plurality of regular interrupt signals are used, the duration between two consecutive interrupt signals can vary.

In a preferred configuration of the method, the evaluation unit is in a sleep mode, from which it is reactivated by means of the atypical interrupt signal or the plurality of interrupt signals composed of regular and/or atypical interrupt signals.

Energy can thus be saved in regular operation with the sleep mode of the evaluation unit. The sleep mode is configured such that a large number of the functions of the evaluation unit are deactivated, and only a part of the evaluation unit that reacts to a first atypical interrupt signal or a first series of interrupt signals remains activated. This part is configured such that it can wake up the rest of the evaluation unit, i.e., reactivate it from sleep mode.

The evaluation unit can be configured in two parts as a logic unit and a microcontroller, for example, wherein both the logic unit and the microcontroller are connected to the interrupt pin, and, when it receives an atypical interrupt signal or a predetermined series of interrupt signals, the logic unit activates the microcontroller and the microcontroller evaluates further interrupt signals, thus transmitting the data.

Dividing the evaluation unit in this way makes it possible to achieve a particularly energy-efficient sleep mode of the evaluation unit, in which the microcontroller can be completely deactivated and is activated by the logic unit, e.g., a field-programmable gate array (FPGA), only when necessary, i.e., if it receives an atypical interrupt signal or a predetermined series of interrupt signals. Thus, even more energy can be saved than with a microcontroller in sleep mode, because the microcontroller can be completely deactivated and only the very energy-saving field-programmable gate array has to be activated.

To increase the energy efficiency of the method even further, it is advantageous if the evaluation unit goes back into sleep mode after a specified time or after a specified signal. This means that, depending on the configuration of the underlying circuit, the microcontroller itself goes into sleep mode, or, in the case of a two-part evaluation unit, the microcontroller is deactivated but the field-programmable gate array (FPGA) is not.

The interrupt signals for the method for data transmission can, for example, be generated by reading data from the integrated circuit. The data can be read block-by-block.

The data can originate from a data source that can be configured as a mobile terminal device, for example, in particular a mobile phone, and is connected wirelessly to the integrated circuit. The data source can then trigger the interrupt signals by selectively reading data and thus transmit data to the integrated circuit and the downstream evaluation unit.

By using a read operation to generate the interrupt signals, a write operation or a data transmission can nevertheless be achieved in circuit arrangements that do not support a write command.

With the data transmission it is therefore possible to write to a memory, for example. However, a variety of other information can also be transmitted in this way.

A backward channel, i.e., a data transmission from the evaluation unit to the integrated circuit, can be achieved by the evaluation unit writing to a memory of the integrated circuit. This memory can be read again by a third unit and the information written in the memory can thus be made available.

The method described above can preferably be used for data transmission between an integrated circuit and an evaluation unit connected to an interrupt pin of the integrated circuit.

For this use, the integrated circuit is preferably configured as an NFC circuit and the evaluation unit is configured as a microcontroller or as a field-programmable gate array (FPGA) with a microcontroller.

A circuit arrangement according to the invention comprises an integrated circuit, which is configured as an NFC circuit, and an evaluation unit, which is configured in two parts as a logic unit and a microcontroller, wherein the logic unit and the microcontroller are directly or indirectly connected to an interrupt pin of the integrated circuit and an output of the logic unit is connected to an input of the microcontroller.

With such a configuration of the circuit arrangement it is nevertheless possible to enable a write command for an NFC circuit that does not support a write command or for reading devices that do not support a write command.

In one embodiment, both the logic unit and the microcontroller are directly connected to the interrupt pin.

The logic unit can also include a buffer for storing a sequence of interrupt signals.

The sequence of interrupt signals can thus be temporarily stored in the buffer and, if the microcontroller is not transferred from a sleep mode to an active operating state quickly enough, or if immediate reception of the sequence of interrupt signals was incomplete or disrupted for other reasons, can be retrieved again by the microcontroller. Alternatively, this can create redundancy for the transmission of the data.

DETAILED DESCRIPTION OF THE FIGURES

FIG. 1 shows a first design example of a circuit arrangement 1 in which the method according to the present application can be used.

The circuit arrangement 1 according to FIG. 1 comprises an integrated circuit 3, the interrupt pin 31 of which is connected to an evaluation unit 5 via an interrupt line 33. The evaluation unit 5 is also connected to the integrated circuit 3 via a data line 35, via which the integrated circuit 3 can read data from a memory 51 of the evaluation unit 5. In the present design example, the data line 35 is unidirectional, i.e., the integrated circuit 3 can read data from the memory 51 of the evaluation unit 5, but cannot change the data stored in the memory 51 via the data line 35.

In the design example shown in FIG. 1, a data source 11, on which data is stored that is to be transmitted to the memory 51 of the evaluation unit 5, is connected to the integrated circuit 3 as well.

The data source 11 is connected to the integrated circuit 3 via a near-field communication (NFC) wireless link.

Selectively sending read commands to the integrated circuit 3 results in the selective generation of interrupt signals in said circuit, which are present on the output side at the interrupt pin 31. Since the evaluation unit 5 is connected to this interrupt pin 31 via the interrupt line 33, it can pick up and evaluate the resulting series of interrupt signals. Data can thus be transmitted from the data source 11 to the evaluation unit 5 by means of suitably agreed coding, which has to be known to both the data source 11 and the evaluation unit 5, and, for example, stored there in the memory 51.

Figure 2:
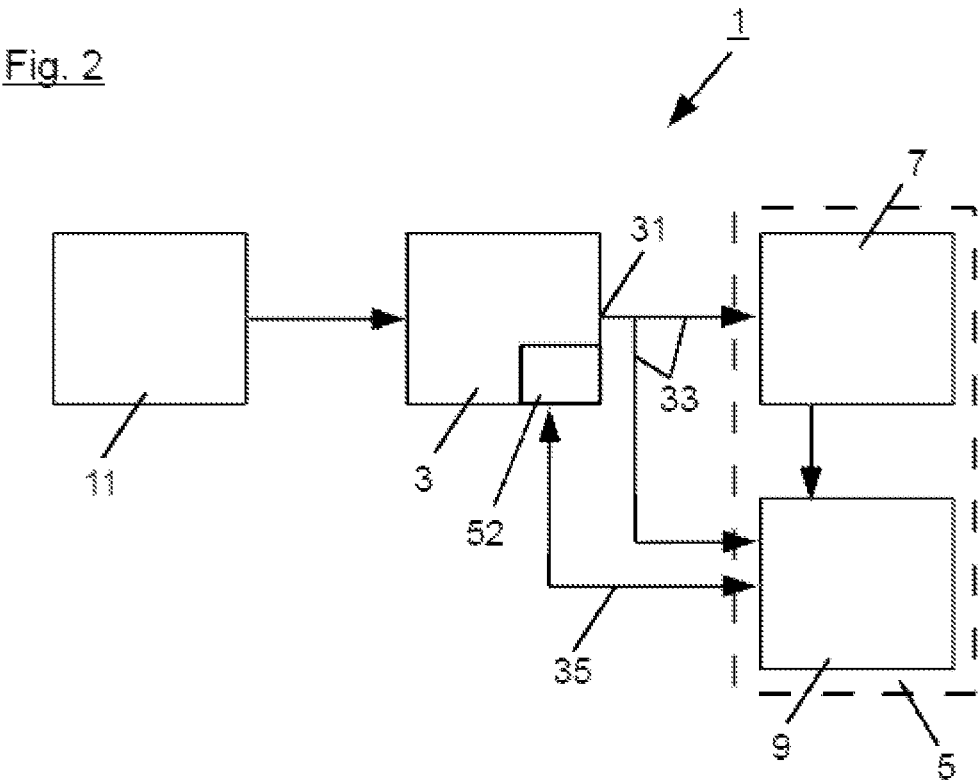
FIG. 2 is a schematic drawing evidencing a second design example of a circuit arrangement, in which the method according to the present application can be used.

FIG. 2 shows a second design example of a circuit arrangement 1, in which the method according to the present application can be used.

In contrast to the circuit arrangement shown in FIG. 1, in the design example of FIG. 2, the evaluation unit 5 is formed by a logic unit 7 and a microcontroller 9, whereby both the logic unit 7 and the microcontroller 9 are connected via an interrupt line 33 to the interrupt pin 31 of the integrated circuit 3.

In the present design example, the data line 35 is configured between the integrated circuit 3 and the microcontroller 9 and would in principle support bidirectional communication between the integrated circuit 3 and the microcontroller 9.

In the design example shown in FIG. 2, however, the data source 11 only supports read commands for the NFC connection configured between the data source 11 and the integrated circuit 3, so that in this design example, too, data transmission from the data source 11 to the evaluation unit 5 takes place via the selective execution of read commands, the resulting triggering of interrupt signals and the evaluation of these interrupt signals by the evaluation unit 5.

A memory 52 present in the integrated circuit 3 can be freely modified by the evaluation unit 5, which means in particular read and written to. This data or modification of the data can be detected by the data source 11, which results in a response. This makes it possible to check faulty interrupt signals or sequences.

The two-part configuration of the evaluation unit 5 with a logic unit 7 and a microcontroller 9 has the advantage that the microcontroller can be deactivated at times when no data transmission is taking place, while the logic unit 7, which can be configured as a field-programmable gate array (FPGA), for example, monitors the interrupt line 33 for interrupts and activates the microcontroller only when necessary.

To save more energy, the microcontroller 9 returns to a deactivated state after a specifiable time without data transmission, so that then again only the logic unit 7 has to be supplied with energy to monitor the interrupt line 33. When an interrupt signal occurs, the logic unit 7 transfers the microcontroller 9 to the active state, so that it can evaluate the interrupt signals.

It can further be provided that the interrupt signal is delivered from the integrated circuit 3 to the microcontroller 9 via the logic unit, i.e., that there is no direct connection between the microcontroller 9 and the interrupt pin 31 of the integrated circuit 3.

Additionally or alternatively, there can be a data line between the logic unit 7 and the microcontroller 9. The logic unit 7 can furthermore comprise a buffer in which the information present at the interrupt pin 31 is temporarily stored. If a start of the microcontroller 9 in response to a first interrupt signal is too slow, so that it cannot fully acquire a sequence of interrupt signals, for example, the sequence can be retrieved from the buffer and delivered to the microcontroller 9 again.

Figure 3:
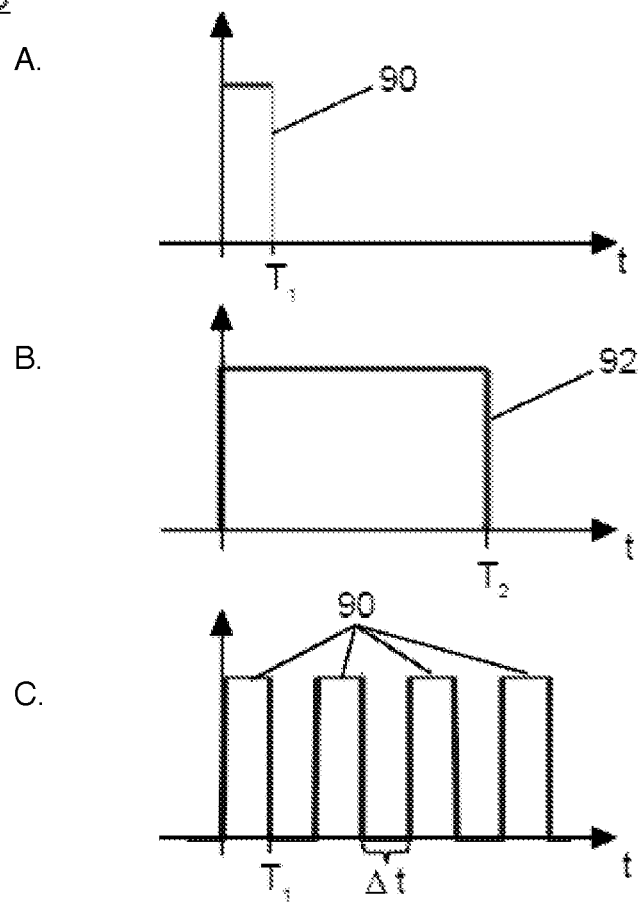
FIGS. 3A, 3B and 3C are line drawings evidencing, respectively, a regular interrupt signal, an atypical interrupt signal and a sequence of regular interrupt signals.

FIG. 3 shows different interrupt signals in the subfigures a) to c). FIG. 3a) shows a regular interrupt signal 90, which is realized as a square wave signal with a period duration T1. Such regular interrupt signals 90 are already known from the state of the art.

FIG. 3b) shows an atypical interrupt signal 92. In the design example shown here, the atypical interrupt signal 92 has a signal duration T2 that is a multiple of the signal length T1 of a regular interrupt signal 90. These differences in signal length between a regular interrupt signal 90 and an atypical interrupt signal 92 can be detected by the evaluation unit 5 and thus a data transmission can be utilized.

FIG. 3c) shows a sequence of irregular interrupt signals 90. The irregular interrupt signals 90 shown here respectively have a signal length T1 and a signal distance Δt. A plurality of different series, which can be a mix of regular interrupt signals 90 and atypical interrupt signals 92, for example, and/or the interrupt signals of which can have different signal distances, can be used particularly effectively to transmit data from a data source 11 via an integrated circuit 3 to an evaluation unit 5.

In each case, in the aforementioned design examples, the data source is configured as a mobile phone with an NFC interface, the integrated circuit is configured as an NFC circuit which is disposed on an NFC chip.

Figure 4:
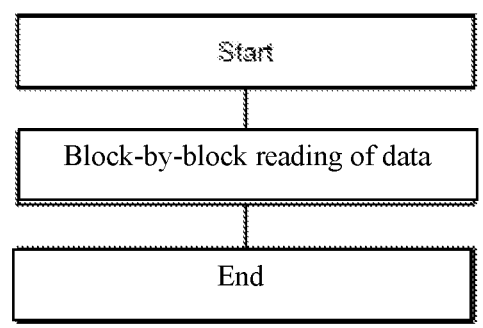
FIG. 4 is a flow chart evidencing a simplified, a possible method sequence.

FIG. 4 shows a simplified method sequence of a method according to the present application.

After starting the method, data transmission by means of a series of interrupt signals is established by reading data block-by-block via the integrated circuit 3. This reading can read the memory 51 or 52, thus establishing a backward channel. When the data transmission is complete, the method is terminated.

Figure 5:
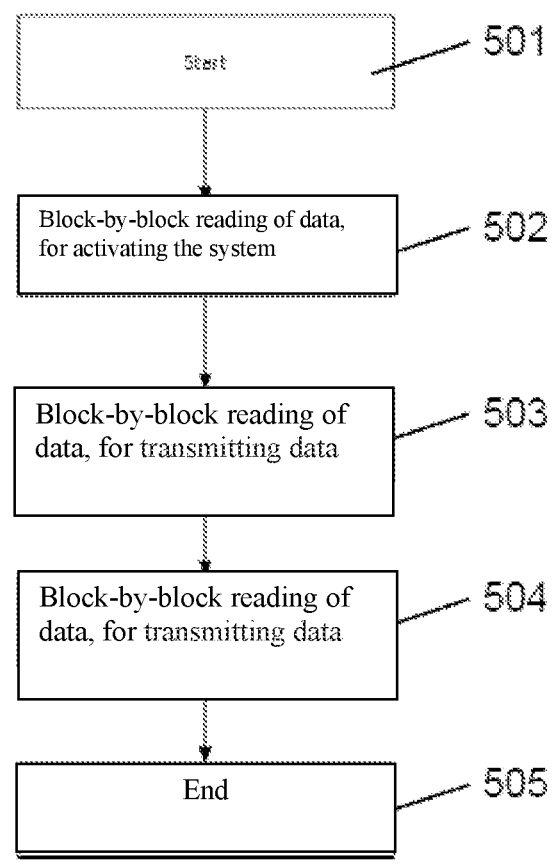
FIG. 5 is a flow chart evidencing a method sequence as used in the circuit arrangement according to FIG. 2.

FIG. 5 shows a detailed method sequence of a method according to the present application, as can be used in the circuit arrangement shown in FIG. 2.

The data source 11, which can be a smartphone, communicates with the integrated circuit 3, an NFC chip, via a wireless data line 36, for example an NFC wireless link.

In a first step 501, the method starts, the evaluation unit 5 is in sleep mode. In a second step 502, the data source reads data from the integrated circuit 3 block-by-block via the wireless data line 36. This block-by-block reading generates an atypical interrupt signal 92 on the interrupt line 33. This activates the evaluation unit 5. In a third step 503, the data source 11 can transmit data to the evaluation unit 5 via the wireless data line 36 and the integrated circuit 3. Various sequences of interrupt signals 90 and/or atypical interrupt signals 92 can be used for this purpose. In a fourth step 504, the block-by-block reading of data required for this can simultaneously be used as a backward channel from the evaluation unit 5 to the data source 11. In a fifth step 505, the method is terminated and the evaluation unit 5 returns to an operating mode with reduced energy consumption.

LIST OF REFERENCE NUMBERS

1 Circuit arrangement
3 Integrated circuit
5 Evaluation unit
7 Logic unit
9 Microcontroller
11 Data source
31 Interrupt pin
33 Interrupt line
35 Data line
36 Wireless data line
51 Memory
52 Memory
90 Regular interrupt signal
92 Atypical interrupt signal
t Time
$T_1$ Duration
$T_2$ Duration
Δt Distance Unless indicated otherwise, identical reference numbers in the figures identify identical components with the same function. The terms drive unit and drive are used interchangeably herein.

The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

I claim:
1. A method for data transmission, such data transmission constituting the transmission of freely selectable data from an integrated circuit to an evaluation unit connected to an interrupt pin of the integrated circuit, wherein the data transmission is carried out by selectively triggering an atypical interrupt signal or a plurality of interrupt signals composed of regular and atypical interrupt signals and wherein the freely selectable data is coded by the atypical interrupt signals or a plurality of interrupt signals composed of regular and atypical interrupt signals.

2. The method according to claim 1, wherein the atypical interrupt signal or signals have a duration that differs from that of a regular interrupt signal.

3. The method according to claim 2, wherein the plurality of interrupt signals is configured as a sequence of regular interrupt signals and/or atypical interrupt signals.

4. The method according to claim 3, wherein the sequence is configured as a succession of interrupt signals having different distances between the interrupt signals.

5. The method according to claim 1, wherein the evaluation unit is in a sleep mode, from which it is reactivated by means of the atypical interrupt signal or the plurality of interrupt signals composed of regular interrupt signals and/or atypical interrupt signals.

6. The method according to claim 5, wherein the evaluation unit is configured in two parts as a logic unit and a microcontroller, wherein both the logic unit and the microcontroller are connected to the interrupt pin, and, when it receives an atypical interrupt signal, the logic unit activates the microcontroller and the microcontroller evaluates further interrupt signals, thus transmitting the data.

7. The method according to claim 5, wherein the evaluation unit returns to sleep mode after a specified time or after a specified signal.

8. The method according to claim 1, wherein the interrupt signal or signals are generated by reading data from the integrated circuit.

9. The method according to claim 8, wherein the data is read block by block.

10. The method according to claim 1, wherein the data transmission writes to a memory.

11. The method according to claim 1, wherein the evaluation unit writes to a memory of the integrated circuit, thus configuring a backward channel.

12. A method according to claim 1, wherein the data originates from a data source that is wirelessly connected to the integrated circuit.

13. A method of use of the method according to claim 1 for data transmission between an integrated circuit and an evaluation unit connected to an interrupt pin of the integrated circuit.

14. A method of use according to claim 12, wherein the integrated circuit is configured as a Near Filed Communication circuit and the evaluation unit is configured as a Field Programmable Gate Array or microcontroller.

15. A circuit arrangement comprising an integrated circuit, which is configured as a Near Filed Communication circuit, and an evaluation unit, which is configured in two parts as a logic unit and a microcontroller, wherein the logic unit and the microcontroller are directly or indirectly connected to an interrupt pin of the integrated circuit and an output of the logic unit is connected to an input of the microcontroller.

16. The circuit arrangement according to claim 15, wherein both the logic unit and the microcontroller are directly connected to the interrupt pin.

17. The circuit arrangement according to claim 15, wherein the logic unit comprises a buffer for storing a sequence of interrupt signals.

18. The method according to claim 1, wherein the plurality of interrupt signals is composed of regular or atypical interrupt signals.

* * * * *